United States Patent [19]

Unitt

[11] Patent Number: 5,046,807
[45] Date of Patent: Sep. 10, 1991

[54] FIBRE OPTIC TRANSMISSION SYSTEM

[75] Inventor: Brian M. Unitt, Herts, Great Britain

[73] Assignee: STC plc, London, England

[21] Appl. No.: 484,188

[22] Filed: Feb. 22, 1990

[30] Foreign Application Priority Data

Mar. 1, 1989 [GB] United Kingdom ............... 8904632

[51] Int. Cl.⁵ ............................................. G02B 6/28
[52] U.S. Cl. ....................................... 359/113; 307/1;
359/137; 385/24; 385/15
[58] Field of Search .......................... 350/96.16, 96.15;
455/605, 606, 610, 612, 617; 370/1-4

[56] References Cited

U.S. PATENT DOCUMENTS 4,366,565 12/1982 Herskowitz ............................ 370/1
4,580,872 4/1986 Bhatt et al. ...................... 350/96.16
4,829,511 5/1989 Georgiou ................................ 370/1
4,870,637 9/1989 Follett et al. ................... 455/612 X
4,933,990 6/1990 Mochizuki et al. .......... 350/96.16 X Primary Examiner—William L. Sikes
Assistant Examiner—Phan T. Heartney
Attorney, Agent, or Firm—Lee, Mann, Smith, McWilliams & Sweeney

[57] ABSTRACT

A passive distribution system for electromagnetic radiation using waveguides and couplers wherein radiation from a source is distributed to a number of destination points, including means at destination points for determining the power levels received at the destination points and means for transmitting from the destination points to the source location information representing said received power levels.

10 Claims, 1 Drawing Sheet

FIBRE OPTIC TRANSMISSION SYSTEM

BACKGROUND TO THE INVENTION

This invention relates to a passive fibre optic transmission system wherein optical power from a single source location, e.g. a semiconductor laser, can be distributed to a number of destination points. Typically the fibre optic system can resemble a tree structure in which power from the source location is fed, via couplers and intermediate lengths of optical fibre, from a single input fibre to a number of output branches. Such a network can be used, for example, to distribute television signals from a local transmitter to a number of domestic receivers.

Since the optical power from the source is divided between the destination points, for a given receiver sensitivity the number of such destination points which can be served by a single source is limited by the power launched into the fibre by the source device. In many instances, such as in a television distribution system, the source power must be restricted on safety grounds because of the danger of permanent damage to the human eye arising from overexposure to the invisible radiation, for example arising from looking at the end of a broken fibre.

SUMMARY OF THE INVENTION

According to the present invention there is provided a passive distribution system for electromagnetic radiation using waveguides and couplers wherein radiation from a source is distributed to a number of destination points, including means at destination points for determining the power levels received at the destination points and means for transmitting from the destination points to the source location information representing said received power levels.

In a preferred embodiment of the invention the source location includes means responsive to said information to regulate the source power in the event of a perceived fault in the distribution system.

BRIEF DESCRIPTION OF THE DRAWINGS

Embodiments of the invention will now be described with reference to the accompanying drawings, in which.

DESCRIPTION OF PREFERRED EMBODIMENT

Figure 1:
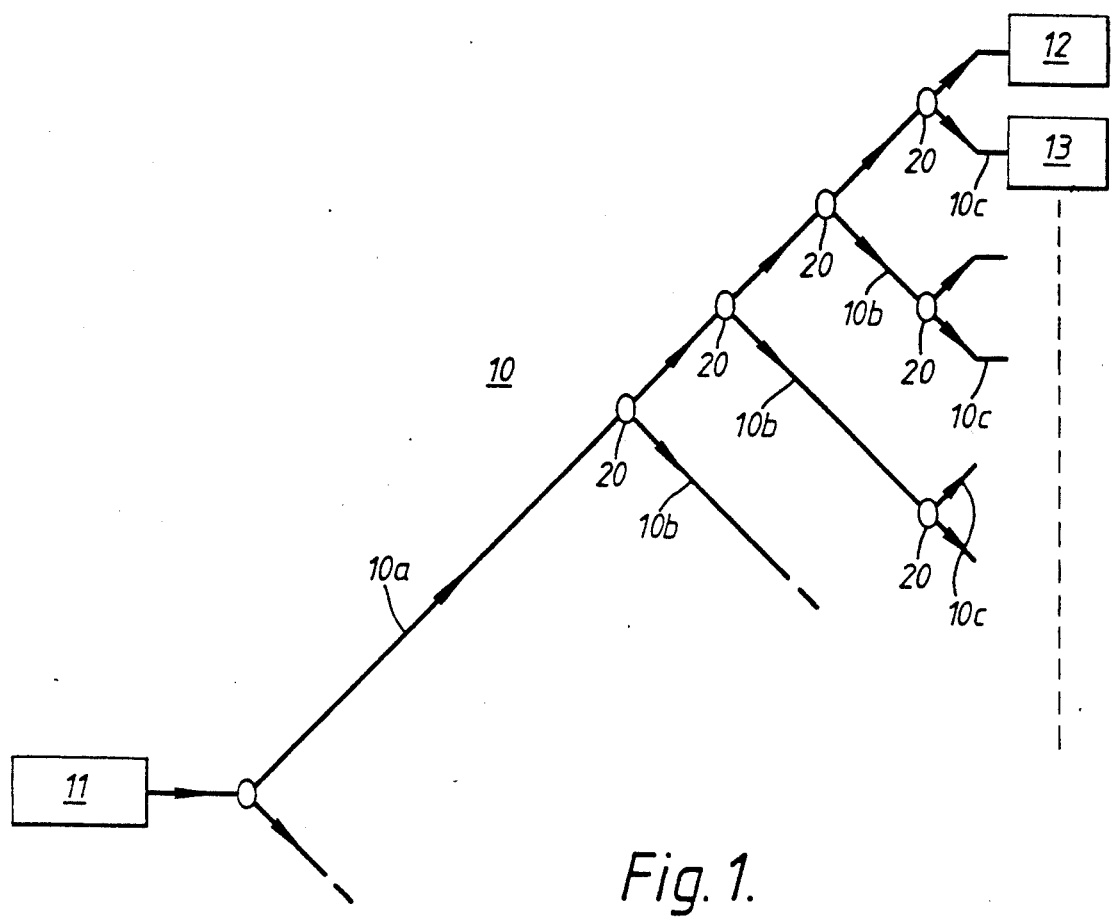
FIG. 1 is a schematic illustration of a passive distribution system.

The passive distribution system illustrated in FIG. 1 comprises an optical fibre network 10 coupling an optical transmitter 11 with a number of optical receivers 12, 13 . . . The network 10 resembles a tree structure with a single initial fibre link 10a being connected via couplers 20 to further fibre links 10b, 10c . . . As has been stated above, the number of destination points is limited according to the power which can be launched into the system. If the power level can be increased without loss of safety then the number of receivers can be increased accordingly.

The present invention provides a system wherein information regarding the power levels at the receivers is fed back to the source. Then, if the optical signal fails to arrive at a sufficiently large number of receivers, this could indicate a fault in the system (for example, a fibre break or disconnection) at a point close to the optical transmitter where the optical power is relatively high. If this status information is used to disable the optical transmitter in the event of such a break it may be acceptable to increase the launched power to enable a greater number of destination locations to be served for a given received power level. In order to prevent undesirable shutdown due to a single faulty receiver the returning status information can be collated at the source location and shutdown is then effected only if the fault information pattern indicates a break sufficiently close to the source to constitute a potential danger.

In order for the system to be failsafe a regular, positive indication of correct functioning of the receivers is required at the source location to maintain the output of the optical transmitter.

Figure 2:
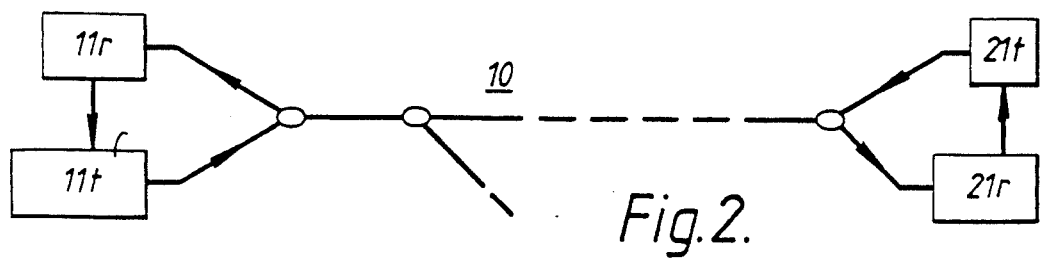
FIG. 2 illustrates one arrangement for transmitting power level information from destination points to the source location.

In the arrangement shown in FIG. 2 the distribution system is assumed to have the capability of duplex or 2-way operation over the fibre links. Each optical receiver 21r includes a circuit for, monitoring the optical power of the received signal. The receiver provides a power level signal to an associated transmitter 21t from which a coded status signal is fed into the network. At the source location a status information receiver 11r receives the status information signals from all the destination points. Since the status information signals can be sent relatively slowly compared with the television signals they can readily be time multiplexed, thus requiring only a very narrow bandwidth. The status information from the destination points is collated in logic circuitry. If status information is not received from one destination only this indicates that a fault or break has occurred in the last link of the system. This being so the optical power emanating from the break will be within normal safety limits. If status information is not received from a pair of adjacent destinations then the fault is likely to be in the penultimate link. Even so, the power emanating from the fault may still be within safety limits. However, if status information is not received from a group of, say, eight adjacent destinations in a 16 destination system then the fault is most likely to be in one of the two second links in the system. Power emerging from a break in this link will almost certainly exceed safety limits. The logic circuitry is therefore arranged to evaluate the status information from all the destinations and to initiate shutdown of the transmitter 11t when the status information indicates that a fault has occurred which may result in excessive power being emitted from a point in the system. The logic circuitry can, at the same time, indicate in which link the fault is occurring.

Figure 3:
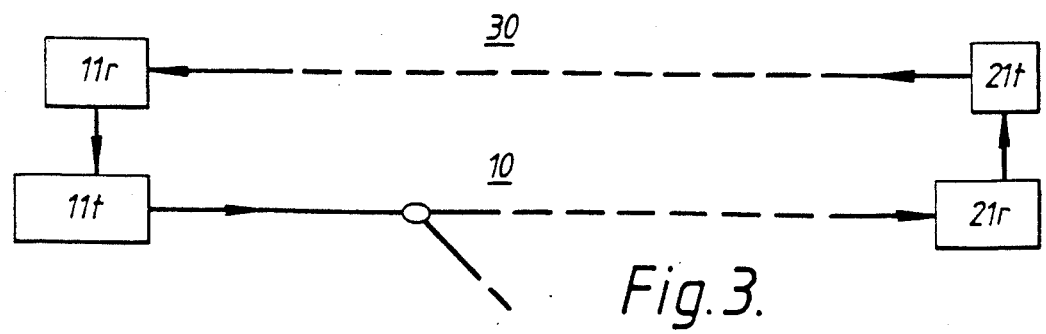
FIG. 3 illustrates another arrangement for transmitting power level information from destination points to the source location.

In the alternative arrangement shown in FIG. 3 the passive distribution system is assumed to be a one-way system in which case the status information is fed back to the source location via a separate independent system 30. This separate system may be another fibre optic system or a totally different system, for example utilising the telephone network.

Whilst reference has been made to power level monitoring circuits and logic circuits it is recognised that such circuits are known and readily available to those skilled in the art.

I claim:

1. A passive distribution system for electromagnetic radiation using waveguides and couplers wherein radiation from a source is distributed to a number of destination points, including means at destination points for determining radiation power levels received at the destination points and means for transmitting from the destination points to the source location information representing said received radiation power levels.

2. A system as claimed in claim 1 wherein the source location includes means responsive to said information to regulate the source radiation power in the event of a perceived fault in the distribution system.

3. A system according to claim 2 wherein the source is an electro-optic device and the distribution system comprises optical fibres and couplers.

4. A system according to claim 3 including at the source location means for collating information received from a number of destination points, means for evaluating the collated information and for initiating shutdown of the source in the event of a perceived fault in the distribution system when said fault constitutes a defined hazard.

5. A system according to claim 3 wherein the transmission of information from the destination points to the source location is effected by duplex transmission in the system.

6. A system according to claim 4 wherein the transmission of information from the destination points to the source location is effected by duplex transmission in the system.

7. A system according to claim 3 wherein the transmission of information from the destination points to the source location is effected via an independent transmission system.

8. A system according to claim 4 wherein the transmission of information from the destination points to the source location is effected via an independent transmission system.

9. A system according to claim 5 wherein the transmission of information from the destination points to the source location is effected in time division multiplex.

10. A method of operating a passive distribution system for electromagnetic radiation from a source location to a number of destination points using waveguides and couplers, including the steps of transmitting from the destination points to the source location information concerning the operating status of the destination points, collating said information at the source location and regulating the source power in the event of a perceived fault in the system.

* * * * *